(12) United States Patent
Liang et al.

(10) Patent No.: US 10,270,340 B2
(45) Date of Patent: Apr. 23, 2019

(54) TWO-PATH SYMMETRICAL-OUTPUT ADJUSTABLE POWER SUPPLY

(71) Applicant: Shenyang Neusoft Medical Systems Co., Ltd., Shenyang (CN)

(72) Inventors: Aidong Liang, Shenyang (CN); Jian Zhao, Shenyang (CN)

(73) Assignee: Shenyang Neusoft Medical Systems Co., Ltd., Shenyang (CN)

(*) Notice: Subject to any disclaimer, the term of this patent is extended or adjusted under 35 U.S.C. 154(b) by 10 days.

(21) Appl. No.: 15/336,335

(22) Filed: Oct. 27, 2016

(65) Prior Publication Data

US 2017/0194859 A1 Jul. 6, 2017

(30) Foreign Application Priority Data

Dec. 30, 2015 (CN) .......................... 2015 1 1023185

(51) Int. Cl.
*H02M 3/158* (2006.01)
*H02M 1/00* (2006.01)

(52) U.S. Cl.
CPC ...... *H02M 3/158* (2013.01); *H02M 2001/009* (2013.01)

(58) Field of Classification Search
CPC ............ H02M 3/00; H02M 3/02; H02M 3/04; H02M 3/10; H02M 3/145; H02M 3/155;
(Continued)

(56) References Cited

U.S. PATENT DOCUMENTS

| 5,592,072 A * | 1/1997 | Brown ...................... G05F 1/62 323/268 |
| 2008/0164943 A1 * | 7/2008 | Liu ........................ H03F 1/3241 330/149 |
| 2009/0243723 A1 | 10/2009 | Simmonds et al. |
| 2011/0199750 A1 * | 8/2011 | Veselic ..................... G06F 1/26 361/814 |
| 2013/0154591 A1 | 6/2013 | Branca et al. |

FOREIGN PATENT DOCUMENTS

| CN | 101814839 A | 8/2010 |
| CN | 201708706 U | 1/2011 |

(Continued)

OTHER PUBLICATIONS

Ti, "Single-Inductor, Multiple-Output (SIMO) Regulator for AMOLED", Texas Instruments, TPS65136, Jul. 2008, pp. 1-21.*

*Primary Examiner* — Timothy J. Dole
*Assistant Examiner* — Carlos O Rivera-Perez
(74) *Attorney, Agent, or Firm* — Fish & Richardson P.C.

(57) ABSTRACT

An example two-path symmetrical-output adjustable power supply is provided, including a switching power supply module, a positive adjustment module, a negative adjustment module and a first operational amplifier. The switching power supply module is coupled to a DC power supply and the first operational amplifier and configured to output a positive voltage and a negative voltage in common-ground and equal in absolute value according to a feedback control based on a reference voltage and the output voltage of the first operational amplifier. The positive adjustment module is coupled to the positive voltage and configured to output a positive output voltage of the adjustable power supply according to a feedback control based on a given voltage and the positive output voltage. The negative adjustment module is coupled to the negative voltage and configured to output a negative output voltage of the adjustable power supply according to the positive output voltage.

19 Claims, 3 Drawing Sheets

(58) Field of Classification Search
CPC .... H02M 3/156; H02M 3/1563; H02M 3/157;
H02M 3/158; H02M 3/1584; H02M
3/1588; H02M 3/33561; H02M
2001/0009; H02M 2001/0025; H02M
2001/0045; H02M 2001/0067; H02M
2001/008; H02M 2001/0032; H02M
2001/009; H02M 2001/0083; G05F 1/46;
G05F 1/56; G05F 1/577; G05F 1/585;
Y02B 70/00; Y02B 70/14; Y02B
70/1458; Y02B 70/1466; Y02B 70/1475
USPC ........ 323/222–226, 266, 267–280, 282–287,
323/311, 312, 351, 911; 363/63, 65
See application file for complete search history.

(56) References Cited

FOREIGN PATENT DOCUMENTS

| | | | |
|---|---|---|---|
| CN | 203561910 U | | 4/2014 |
| CN | 204103760 U | * | 1/2015 |
| CN | 104731152 A | | 6/2015 |
| EP | 0778510 A1 | | 6/1997 |
| JP | 2011-10540 A | | 1/2011 |
| JP | 2012-170215 A | | 9/2012 |
| KR | 2000-0041560 A | | 7/2000 |
| RU | 2368938 C1 | | 9/2009 |

\* cited by examiner

TWO-PATH SYMMETRICAL-OUTPUT ADJUSTABLE POWER SUPPLY

CROSS REFERENCE TO RELATED APPLICATIONS

This application claims priority under 35 U.S.C. § 119 to Chinese Patent Application No. 201511023185.9, filed on Dec. 30, 2015. The content of the priority application is hereby incorporated by reference in its entirety.

TECHNICAL FIELD

The present disclosure relates to a two-path symmetrical-output adjustable power supply.

BACKGROUND

An adjustable power supply is equipment that may transform DC (direct current) input power into a special form of power supply and has been widely used in various industries, such as medical, military and industrial control areas.

In some cases, an adjustable switching power supply may adjust the duty cycle of switching period by controlling a Pulse-Width Modulation (PWM) control chip with a given voltage, so as to control a high-frequency transformer and thereby achieve adjustable output voltage. Generally, the switching power supply may not achieve 0 V output, nor start two-path adjustment from 0 V. Further, the switching power supply may have a large output ripple, a poor anti-noise performance, and so on.

In some cases, an adjustable linear power supply may lower the voltage of a DC power supply by controlling an adjusting transistor with a given voltage, so as to achieve a DC adjustable voltage output. Generally, the linear power supply may have problems of being bulky, adjustment range limited by power consumption, low efficiency and so on.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

One aspect of the present disclosure features a two-path symmetrical-output adjustable power supply, comprising: a switching power supply module including: a first input end coupled to a DC power supply, and a second input end coupled to an output end of a first operational amplifier, wherein the switching power supply module is configured to output a positive voltage and a negative voltage according to a feedback control based on a reference voltage and an output voltage of the first operational amplifier, the positive voltage and the negative voltage being in common-ground and equal in absolute value; a positive adjustment module including: an input end coupled to the positive voltage, and an output end as a positive output voltage of the adjustable power supply, wherein the positive adjustment module is configured to adjust the positive output voltage according to a feedback control based on a given voltage and the positive output voltage; and a negative adjustment module including: an input end coupled to the negative voltage, and an output end as a negative output voltage of the adjustable power supply, wherein the negative adjustment module is configured to adjust the negative output voltage according to the positive output voltage, wherein the first operational amplifier includes: a positive-phase input end coupled to the positive voltage, a negative-phase input end coupled to the positive output voltage, and the output end for outputting a voltage difference between the positive output voltage and the positive voltage, the voltage difference being associated with the output voltage of the first operational amplifier. The given voltage can be among a range defined by the reference voltage In some implementations, the positive adjustment module comprises: a first adjusting transistor including: a first end coupled to the positive voltage, a second end coupled to the positive output voltage, and a control end coupled to an output end of a second operational amplifier; and the second operational amplifier including: a negative-phase input end coupled to the positive output voltage through a first resistor and to the ground through a second resistor, and a positive-phase input end coupled to the given voltage. The first adjusting transistor can be a triode or an MOS transistor.

In some implementations, the negative adjustment module comprises: a second adjusting transistor including: a first end coupled to the negative output voltage, a second end coupled to the negative voltage, and a control end coupled to the output end of a third operational amplifier; and the third operational amplifier including a positive-phase input end coupled to the ground and a negative-phase input end coupled to the positive output voltage through a third resistor and the negative output voltage through a fourth resistor. The third resistor and the fourth resistor cam be equal in resistance value. The second adjusting transistor can be a triode or a MOS transistor.

In some implementations, the two-way symmetrical-output adjustable power supply further comprises: a positive load adjustment module including: a first end coupled to the positive output voltage, a second end coupled to the ground through a seventh resistor, and a third end coupled to an output end of a fourth operational amplifier; a negative load adjustment module including: a first end coupled to the second end of the positive load adjustment module, a second end coupled to the negative output voltage, and a third end coupled to the output end of the fourth operational amplifier; and the fourth operational amplifier including: a positive-phase input end to be in common-ground with the switching power supply module, and a negative-phase input end coupled to the positive voltage through a fifth resistor and the negative voltage through a sixth resistor. The fifth resistor and the sixth resistor can be equal in resistance value.

In some examples, the positive load adjustment module comprises a third adjusting transistor, and the third end of the positive load adjustment module is a control end of the third adjusting transistor, and the negative load adjustment module comprises a fourth adjusting transistor, and the third end of the negative load adjustment module is a control end of the fourth adjusting transistor. In some examples, the third adjusting transistor is a MOS transistor, and the fourth adjusting transistor is a MOS transistor. In some examples, the third adjusting transistor is a triode, and the fourth adjusting transistor is a triode.

In some implementations, the two-way symmetrical-output adjustable power supply further comprises: a first proportional adjustment module including: an input end coupled to the positive voltage, and an output end coupled to the positive-phase input end of the first operational amplifier through an eighth resistor, wherein the first proportional adjustment module is configured to output the positive voltage multiplied by 1/K, the K is an integer greater than 1; and a second proportional adjustment module including: an input end coupled to the positive output voltage, and an output end coupled to the negative-phase input end of the first operational amplifier through a ninth resistor, wherein the second proportional adjustment module is configured to output the positive input voltage multiplied by 1/K, wherein the positive-phase input end of the first operational amplifier is coupled to the ground through a tenth resistor, wherein the negative-phase input end of the first operational amplifier is coupled to the output end of the first operational amplifier through an eleventh resistor, wherein the output end of the first operational amplifier is coupled to the second input end of the switching power supply module through a twelfth resistor, and wherein the second input end of the switching power supply module is coupled to the ground through a thirteenth resistor.

In some examples, the eighth resistor and the ninth resistor are equal in resistance value, the tenth resistor and the eleventh resistor are equal in resistance value, and the resistance value of the tenth resistor is as K times as that of the eighth resistor. In some examples, the switching power supply module comprises a fifth operational amplifier including: a positive-phase input end coupled to the reference voltage; a negative-phase input end coupled to the second input end of the switching power supply module; and an output end coupled to the negative-phase input end of the fifth operational amplifier through a first capacitance and a fourteenth resistor.

Another aspect of the present disclosure features a method comprising: receiving an input voltage from a DC power supply; generating a positive voltage and a negative voltage based on the input voltage and according to a first feedback control based on a reference voltage and an output voltage of an operation amplifier, the positive voltage and the negative voltage being in common-ground and equal in absolute value; outputting a positive output voltage based on the positive voltage and according to a second feedback control based on a given voltage and the positive output voltage; and outputting a negative output voltage based on the negative voltage and the positive output voltage, wherein the output voltage of the operational amplifier is associated with a voltage difference between the positive output voltage and the positive voltage.

In some examples, outputting a positive output voltage comprises adjusting the positive output voltage according to a voltage division feedback of the positive output voltage and the given voltage, and outputting a negative output voltage comprises controlling the negative output voltage to equivalently track the positive output voltage.

In some examples, the method further comprises preventing an asymmetry output between the positive voltage and the negative voltage. In some examples, the method further comprises providing, as an input of the operational amplifier, the positive voltage multiplied by 1/K and the positive output voltage multiplied by 1/K, K being an integer greater than 1; and recovering the output voltage of the operation amplifier by K times to be the voltage difference. In some examples, the method further comprises: providing a portion of the voltage difference for the first feedback control; and obtaining the positive output voltage by subtracting the voltage difference from the positive voltage.

The details of one or more embodiments of the subject matter described in the present disclosure are set forth in the accompanying drawings and description below. Other features, aspects, and advantages of the subject matter will become apparent from the description, the drawings, and the claims.

BRIEF DESCRIPTION OF DRAWINGS

Features of the present disclosure are illustrated by way of example and not limited in the following figures, in which like numerals indicate like elements.

DETAILED DESCRIPTION

To solve the problems of large output ripple of switching power supply and low efficiency of linear power supply, two fixed voltages may be output through one switching power supply, the two fixed voltages each may control voltage drop of respective adjusting transistors through a given voltage, so as to achieve the linear adjustment of output voltage. However, excessive voltage difference of adjusting transistor in low voltage output may cause excessive power consumption.

According to an example of the present disclosure, a two-path symmetrical-output adjustable power supply linearly adjusted by a switching power supply with low power consumption is developed. The two-path symmetrical-output adjustable power supply may control an output of a positive linear adjusting transistor through a given voltage, then control the switching power supply to output positive and negative equivalent follow-up voltages through a voltage difference of the positive linear adjusting transistor. Where, the two follow-up voltages may be only higher than the output voltages of respective adjusting transistors by a lower fixed value. Then the output of negative adjusting transistor may be symmetrically controlled by tracking a positive output. Thus, since the low voltage difference of two adjusting transistors may be ensured in the wide range of positive and negative output voltage adjustment, the low power consumption for linear adjustment output by the switching power supply may be achieved.

Figure 1:
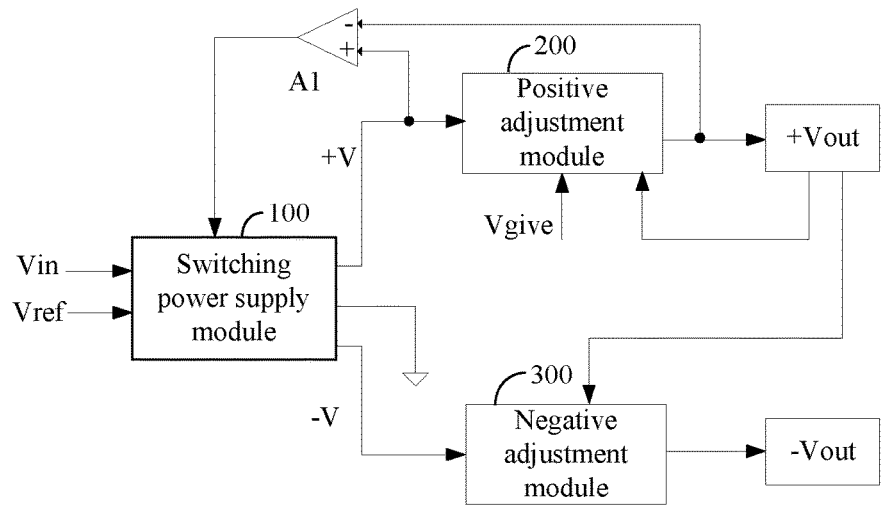
FIG. 1 is a schematic diagram of the two-path symmetrical-output adjustable power supply provided according to an example of the present disclosure.

FIG. 1 is a schematic diagram of the two-path symmetrical-output adjustable power supply provided according to an example of the present disclosure.

The two-path symmetrical-output adjustable power supply provided by the example may comprise a switching power supply module 100, a positive adjustment module 200, a negative adjustment module 300 and a first operational amplifier A1. The adjustable power supply has a positive output voltage +Vout and a negative output voltage −Vout.

A first input end of the switching power supply module 100 is connected to a DC power supply Vin, and the switching power supply module 100 may output the required positive voltage +V and negative voltage −V according to a feedback control based on a reference voltage Vref and an output voltage of the first operational amplifier A1. The reference voltage Vref may be 1.25 V, 2.5 V or 5 V, or any other suitable voltage value. Where, the positive voltage +V and the negative voltage −V are in common-ground and equal in absolute value, and may be adjusted according to a voltage difference adjustment of the positive adjustment module 200.

The difference between the positive voltage +V and the positive output voltage +Vout, that is, (+V) minus (+Vout), may be within a range, e.g., from 0.5 V to 5 V. Similarly, the difference between the negative voltage −V and the −Vout, that is |−V| minus |−Vout|, may be within the range, e.g., from 0.5 V to 5 V.

The input end of the positive adjustment module 200 is connected to the positive voltage +V, the output end of the positive adjustment module 200 is the positive output voltage +Vout of the adjustable power supply, and the control end is connected to the given voltage Vgive and the positive output voltage +Vout of the adjustable power supply. In this way, the positive adjustment module 200 may be used for adjusting the positive output voltage +Vout according to a feedback control based on the given voltage Vgive and the positive output voltage +Vout.

The input end of the negative adjustment module 300 is connected to the negative voltage −V, the output end of the negative adjustment module 300 is the negative output voltage −Vout of the adjustable power supply, and the control end is connected to the positive output voltage +Vout of the adjustable power supply. In this way, the negative adjustment module 300 may be used for adjusting the negative output voltage −Vout according to the positive output voltage +Vout.

It would be noted that the value range of the positive and negative output voltages ±Vout may be set from 0 to ±200 V, and the value range of the given voltage Vgive may be set from 0 to Vref. For example, assuming the reference voltage Vref=2.5 V, then: the positive output voltage +Vout=0 V and the negative output voltage −Vout =0 V when the given voltage Vgive=0 V; the positive output voltage +Vout=100 V and the negative output voltage −Vout=−100 V in cooperation with a feedback circuit within the positive adjustment module 200 when the given voltage Vgive=1.25 V; the positive output voltage +Vout=200 V and the negative output voltage −Vout=−200 V in cooperation with the feedback circuit within the positive adjustment module 200 when the given voltage Vgive=2.5 V.

It may be appreciated that the given voltage Vgive may be given by a potentiometer arbitrarily, or a digital/analog converter (DAC).

The first operational amplifier A1 may be a subtraction circuit. For example, as shown in FIG. 1, the positive-phase input end of the first operational amplifier A1 is connected to the positive voltage +V, the negative-phase input end of the first operational amplifier A1 is connected to the positive output voltage +Vout, and the output end of the first operational amplifier A1 is connected to the second input end of the switching power supply module 100. In this way, the output of the first operational amplifier A1 may be (+V)−(+Vout).

In some cases, when the positive output voltage +Vout decreases, for example, decreasing to be lower than the given voltage Vgive, a feedback voltage within the positive adjustment module 200 may decrease. Accordingly, the output of the first operational amplifier A1 may decrease and the output +V of the switching power supply 100 may increase due to a negative feedback control, thereby ensuring steady positive output voltage +Vout and steady voltage difference Vec between the input end and the output end of the positive adjustment module 200. Similarly, when the positive output voltage +Vout increases, for example, increasing to be higher than the given voltage Vgive, the feedback voltage within the positive adjustment module 200 may increase. Accordingly, the output of the first operational amplifier A1 may increase and the output +V of the switching power supply 100 may decrease due to the negative feedback control, thereby ensuring steady positive output voltage +Vout and steady voltage difference Vec of the positive adjustment module 200. In this way, ensuring the voltage difference Vec of the positive adjustment module 200 to be a substantially fixed low value, can thereby achieve a low power consumption for linear adjustment output within a wide range by the switching power supply module 100.

It would be noted that the value range of the voltage difference Vec may be from 0.5V to 5V in order to ensure the achievement of low consumption for linear adjustment.

The two-path symmetrical-output adjustable power supply provided by the example, may adjust the output voltage of the positive adjustment module 200 according to the feedback control base on the single given voltage and the positive output voltage, then use a subtracted value of the input voltage and the output voltage of positive adjustment module 200 through the operational amplifier as the feedback of the switching power supply module 100, so that the switching power supply module 100 may output two follow-up symmetrical voltages efficiently, as the inputs of the positive adjustment module 200 and the negative adjustment module 300, respectively. Furthermore, the adjustment of the output of the negative adjustment module may be achieved through tracking the positive output voltage.

Figure 2:
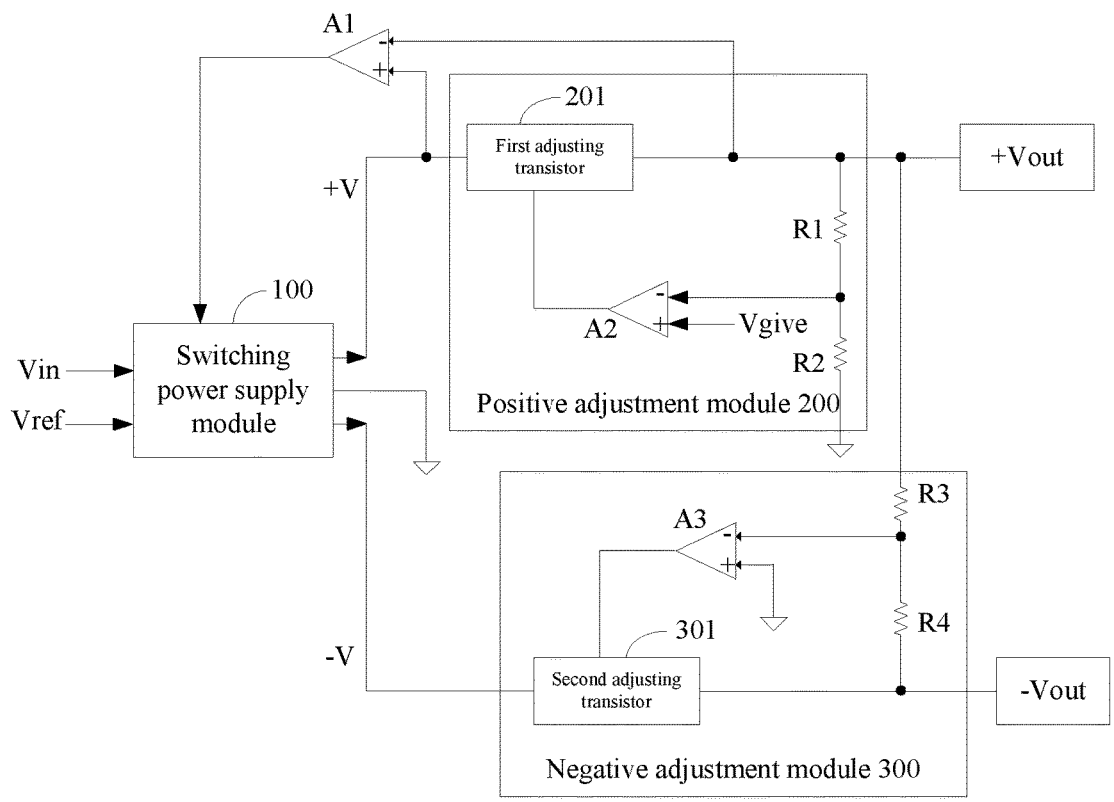
FIG. 2 is a schematic diagram of the two-path symmetrical-output adjustable power supply provided according to another example of the present disclosure.

FIG. 2 is a schematic diagram of the two-path symmetrical-output adjustable power supply provided by another example of the present disclosure and may be considered as a more detailed implementation structure of FIG. 1.

As shown in FIG. 2, the positive adjustment module 200 may comprise a first adjusting transistor 201, a first resistor R1, a second resistor R2 and a second operational amplifier A2.

Where, the first end of the first adjusting transistor 201 is connected to the positive voltage +V, the second end of the first adjusting transistor 201 is connected to the positive output voltage +Vout, and the control end of the first adjusting transistor 201 is connected to the output end of the second operational amplifier A2.

The negative-phase input end of the second operational amplifier A2 is the feedback of the positive output voltage +Vout, and may be generated through the voltage division by the first resistor R1 connected to the positive output voltage +Vout and the second resistor R2 connected to the ground; the positive-phase input end of the second operational amplifier A2 is connected to the given voltage Vgive.

The positive output voltage +Vout may be determined according to the voltage division ratio of the first resistor R1 to R2 and the given voltage Vgive. For example, the reference voltage Vref=2.5 V, and the given voltage Vgive=Vref=2.5 V when the positive output voltage +Vout is 100 V. Assuming the power consumption of the feedback circuit of the second operational amplifier A2 is 0.25 W, that is, the current is 2.5 mA, the second resistor R2=1 kΩ and the first resistor R1=39 kΩ.

The relationship between positive output voltage +Vout and the given voltage Vgive may be explained as follows. According to the "virtual short" principle within the linear region of the operational amplifier, the positive-phase input end and negative-phase input end of the second operational amplifier A2 are equal in voltage value, and the given voltage Vgive may be equal to the divided voltage of positive output voltage +Vout*R2/(R1+R2), and may be represented as the following formula:

$$+Vout=Vgive*(R1+R2)/R2.$$

wherein, the given voltage Vgive may be in the range from 0 to Vref.

The second operational amplifier A2 may adjust the magnitude of the positive output voltage +Vout according to the voltage division feedback of the positive output voltage +Vout and the given voltage Vgive, such that the positive output voltage is adjustable.

On the other hand, the negative adjustment module 300 may comprise a second adjusting transistor 301, a third operational amplifier A3, a third resistor R3 and a fourth resistor R4. Where, the third resistor R3 and the fourth resistor R4 may be equal in resistance value.

The first end of the second adjusting transistor 301 is connected to the negative output voltage −Vout, the second end of the second adjusting transistor 301 is connected to the negative voltage −V, and the control end of the second adjusting transistor 301 is connected to the output end of the third operational amplifier A3.

Both the first adjusting transistor 201 and the second adjusting transistor 301 may be metal-oxide-semiconductor (MOS) transistor, e.g., metal-oxide-semiconductor field-effect (MOSFET) transistor.

The positive-phase input end of the third operational amplifier A3 is connected to the ground, the negative-phase input end of the third operational amplifier A3 is the mean voltage between the positive output voltage +Vout and the negative output voltage −Vout, and may be generated through the average voltage division by the third resistor R3 connected to the positive output voltage +Vout and the fourth resistor R4 connected to the negative output voltage −Vout. Thus, the third operational amplifier A3 may control the negative output voltage −Vout to equivalently track the positive output voltage +Vout with the ground as center.

Figure 3:
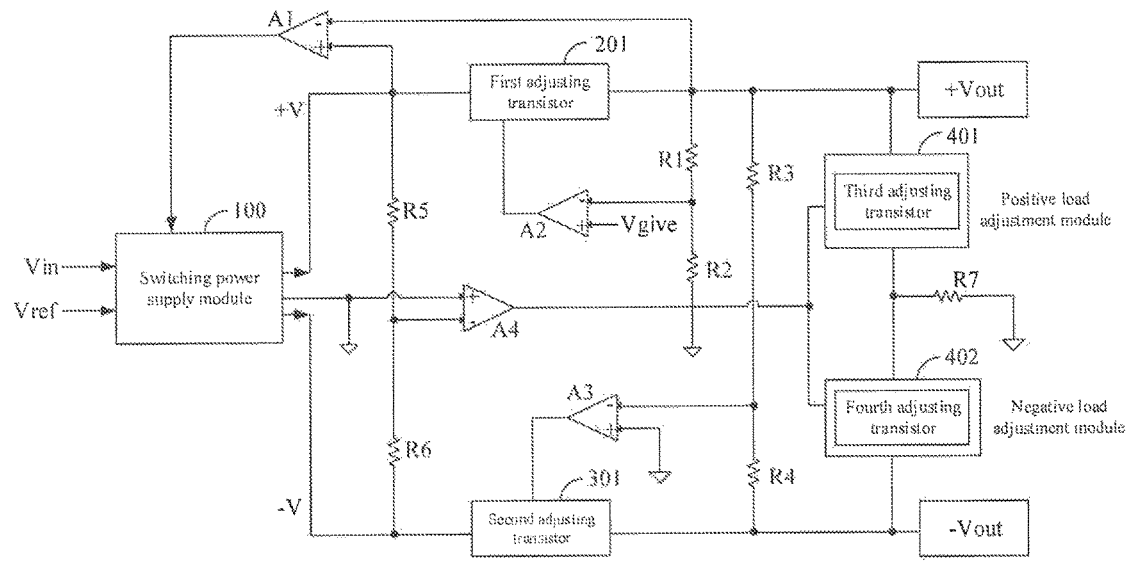
FIG. 3 is a schematic diagram of the two-path symmetrical-output adjustable power supply provided according to still another example of the present disclosure.

FIG. 3 is a schematic diagram of the two-path symmetrical-output adjustable power supply provided by still another example of the present disclosure and may be considered as a more detailed implementation structure of FIG. 2.

Generally speaking, by using a bifilar winding process of transformer secondary and controlling device parameters of an output circuit, the symmetrical output of positive voltage +V and negative voltage −V by the switching power supply module 100 may be guaranteed substantially. However, light load fluctuation and/or non-consistent load and so on still results in unsymmetrical output. Wherein, the light load fluctuation refers to, when the load is zero or very small, pulses output by a PWM chip may be lost intermittently due to a too narrow duration, and thereby the output of a switching power supply may have a low-frequency small-amplitude fluctuation waveform. The light load fluctuation, also referred to as intermittent light load fluctuation, is an unexpected interference and usually may be avoided by increasing pre-load. In some implementations, as shown in FIG. 3, the two-path symmetrical-output adjustable power supply further comprises a symmetric control module for preventing asymmetry output. In some examples, the symmetrical control module may comprise a fourth operational amplifier A4, a positive load adjustment module 401, a negative load adjustment module 402, a fifth resistor R5, a sixth resistor R6 and a seventh resistor R7.

Where, the fifth resistor R5 and the sixth resistor R6 may be equal in resistance value.

The first end of the positive load adjustment module 401 is connected to the positive output voltage +Vout, the second end of the positive load adjustment module 401 is connected to the ground through the seventh resistor R7, and the third end of the positive load adjustment module 401 is connected to the output end of the fourth operational amplifier A4.

The seventh resistor R7 is also referred to as pre-load.

The first end of the negative load adjustment module 402 is connected to the second end of the positive load adjustment module 401, the second end of the negative load adjustment module 402 is connected to the negative output voltage −Vout, and the third end of the negative load adjustment module 402 is connected to the output end of the fourth operational amplifier A4.

The positive-phase input end of the fourth operational amplifier A4 is common grounded with the switching power supply module 100, the negative-phase input end of the fourth operational amplifier A4 is the mean voltage between the positive voltage +V and the negative voltage −V, and may be achieved through the equilibrium voltage division by the fifth resistor R5 connected to the positive voltage +V and the sixth resistor R6 connected to the negative voltage −V.

The positive load adjustment module 401 may comprise a third adjusting transistor, the third end of the positive load adjustment module 401 is the control end of the third adjusting transistor; the negative load adjustment module 402 may comprise a fourth adjusting transistor, the third end of the negative load adjustment module 402 is the control end of the fourth adjusting transistor.

It would be noted that both the third adjusting transistor and the fourth adjusting transistor may be MOS transistor or triode.

Based on the above structure, when the positive voltage +V and the negative voltage −V are equal, the output of the fourth operational amplifier A4 is zero, and both the positive load adjustment module 401 and the negative load adjustment module 402 are turn off. When the positive voltage +V and the negative voltage −V are not equal, the output of the fourth operational amplifier A4 may not be zero. In this case, one of the positive load adjustment module 401 and the negative load adjustment module 402 of a higher voltage may be turned on, and so the current of the higher voltage side is increased. In this way, on the one hand, the light load fluctuation may be get rid of through pre-load, on the other hand, the output load may be balanced through increasing the current of the path with higher voltage due to unbalanced load. Where, the degree of increasing the current of the higher voltage circuit may be controlled through adjusting the breakover current of the third or the fourth adjusting transistor.

Figure 4:
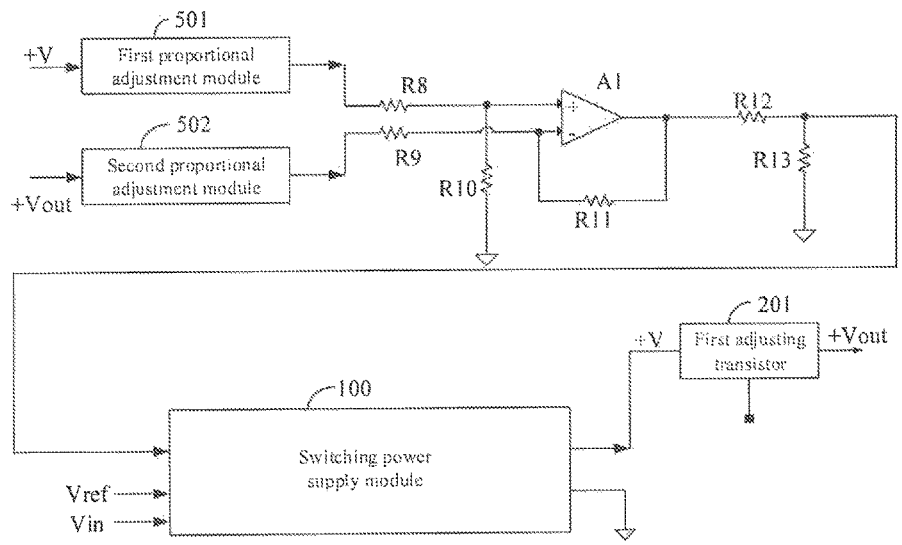
FIG. 4 is a schematic diagram of the two-path symmetrical-output adjustable power supply provided according to still another example of the present disclosure.

FIG. 4 is a schematic diagram of the two-path symmetrical-output adjustable power supply provided by still another example of the present disclosure.

As shown in FIG. 4, the two-path symmetrical-output adjustable power supply may comprise a switching power supply module 100, a first operational amplifier A1, a first adjusting transistor 201, a first proportional adjustment module 501, a second proportional adjustment module 502, an eighth resistor R8, a ninth resistor R9, a tenth resistor R10, an eleventh resistor R11, a twelfth resistor R12 and a thirteenth resistor R13.

Where, the input end of the first proportional adjustment module 501 is connected to the positive voltage +V, the output end of the first proportional adjustment module 501 is connected to the positive-phase input end of the first operational amplifier A1 through the eighth resistor R8. In this way, the first proportional adjustment module 501 may output the positive voltage +V multiplied by 1/K. The K is an integer greater than 1 by default and also referred to as a voltage attenuation proportion.

The input end of the second proportional adjustment module 502 is connected to the positive output voltage +Vout, and the output end of the second proportional adjustment module 502 is connected to the negative-phase input end of the first operational amplifier A1 through the ninth resistor R9. In this way, the second proportional adjustment module 502 may output the positive output voltage +Vout multiplied by 1/K. The K is an integer greater than 1 by default.

The positive-phase input end of the first operational amplifier A1 is connected to the ground through the tenth resistor R10.

The negative-phase input end of the first operational amplifier A1 is connected to the output end of the first operational amplifier A1 through the eleventh resistor R11.

The eighth resistor R8 and ninth resistor R9 may be equal in resistance value. The tenth resistor R10 and eleventh resistor R11 may be equal in resistance value.

The resistance value of the tenth resistor R10 is as K times as that of the eighth resistor R8.

Through outputting the positive voltage +V and the positive output voltage +Vout multiplied by 1/K to the first operational amplifier A1, the maximum voltage value input into the first operational amplifier A1 is within the voltage range of input pin of the first operational amplifier A1, thereby ensuring the first operational amplifier A1 may work normally even if the positive output voltage +Vout and the positive voltage +V are high voltage. For example, when the positive output voltage +Vout=100V and the maximum permitted voltage of the input pin of the first operational amplifier A1 is 12V, the positive output voltage +Vout may be decreased to 10 V by being divided by 10, and the first operational amplifier A1 may work normally.

The first operational amplifier A1, the eighth resistor R8, the ninth resistor R9, the tenth resistor R10 and the eleventh resistor R11 may be used for recovering the voltage attenuation proportion K introduced by the first proportional adjustment module 501 and the second proportional adjustment module 502, so that the output voltage of the first operational amplifier A1 is the voltage difference Vec between the positive output voltage +Vout and the positive voltage +V, that is, the voltage difference of two ends of the first adjusting transistor 201, thereby keeping the difference of the monitoring voltage substantially the same.

The derivation and operation of the voltage difference Vec may be described as follows.

If the positive-phase input end and negative-phase input end of the first operational amplifier A1 have equal voltage and extremely high input impedance so that the input current is zero when the first operational amplifier A1 is within the linear region, the current of the ninth resistor R9 may be equal to that of the eleventh resistor R11, thus the following equation occurs:

$$[K/(1+K)*(+V)/K-(+Vout)/K]/R=[Vec-K/(1+K)*(+V)/K]/KR$$

Where, R is the resistance value of the eighth resistor R8 and the ninth resistor R9. To guarantee the accuracy of voltage division, (1+K)R may be more than 10 times larger than the output impedance of the first proportional adjustment module 501 and the second proportional adjustment module 502, for example, R=20 kΩ.

In this way, the voltage difference Vec may be obtained by the following calculation:

$$Vec=(+V)-(+Vout).$$

The output end of the first operational amplifier A1 is connected to the second input end of the switching power supply module 100 after voltage division by the twelfth resistor R12 and the thirteenth resistor R13.

Where, the resistance value of the twelfth resistor R12 may be as m times as that of the eighth resistor R8, and the resistance value of the thirteenth resistor R13 may be as n times as that of the eighth resistor R8. The values of m and n may influence the accuracy of voltage division and the value of the voltage difference Vec. For example, assuming (m+n)R=10 kΩ, m+n=0.5 when R=20 kΩ. When the reference voltage Vref=2.5 V, if the voltage difference Vec is set as 4 V, it may be obtained that n=0.3125 and m=0.1875 according to Vec*n/(m+n)=Vref. That is, the resistance value of the twelfth resistor R12 is mR=3.75 k Ω, and the resistance value of the thirteenth resistor R13 is nR=6.25 kΩ.

Thus, it can be seen that the value of the voltage difference Vec may be changed through setting the values of n and m. Furthermore, the voltage difference Vec may be within the range from 0.5 V to 5 V according to the output current and ripple requirement.

Figure 5:
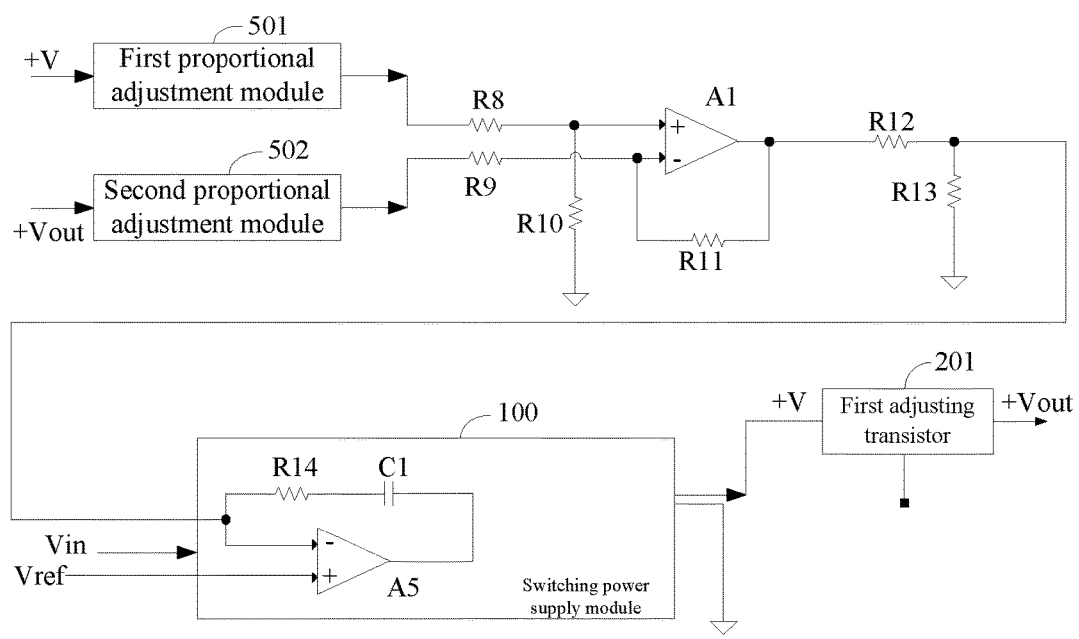
FIG. 5 is a schematic diagram of the two-path symmetrical-output adjustable power supply provided according to still another example of the present disclosure.

FIG. 5 is a schematic diagram of the two-path symmetrical-output adjustable power supply provided by still another example of the present disclosure and may be considered as a more detailed implementation structure of FIG. 4.

Where, the switching power supply module 100 may comprise a fifth operational amplifier A5, a fourteenth resistor R14 and a first capacitance C1.

The positive-phase input end of the fifth operational amplifier A5 is connected to the reference voltage Vref, and the negative-phase input end of the fifth operational amplifier A5 is connected to the second input end of the switching power supply module 100.

The negative-phase input end of the fifth operational amplifier A5 is connected to the output end of the fifth operational amplifier R5 through the fourteen resistor R14 and the first capacitance C1.

Based on the above structure, a feedback voltage of the switching power supply module 100 may be obtained by dividing the voltage difference Vec with n/(m+n) times and output to an error amplifier in a pulse width modulation (PWM) chip of the switching power supply module 100, such that the feedback voltage may be used to perform a proportional integral (PI) adjustment together with the reference voltage Vref. In this way, the switching power supply module 100 may track the feedback control of Vec*n/(m+n), and output the positive output voltage +Vout obtained by subtracting the voltage difference Vec of the adjusting transistor from the positive voltage +V, that is, +Vout=(+V)−Vec.

The figures are only illustrations of an example, wherein the units or procedure shown in the figures are not necessarily essential for implementing the present disclosure. Those skilled in the art will understand that the units in the device in the example may be arranged in the device in the examples as described, or may be alternatively located in one or more devices different from that in the examples. The units in the examples described may be combined into one module or further divided into a plurality of sub-units.

For simplicity and illustrative purposes, the present disclosure is described by referring mainly to an example thereof. In the above description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive, and any changes made, equivalent replacement, or improvement in the protection of the present disclosure should contain within the range. Accordingly, other embodiments are within the scope of the following claims.

The invention claimed is:

1. A two-path symmetrical-output adjustable power supply, comprising:
   a switching power supply module including:
      a first input end coupled to a DC power supply, and
      a second input end coupled to an output end of a first operational amplifier,
      wherein the switching power supply module is configured to output a positive voltage and a negative voltage according to a first feedback control based on a reference voltage and an output voltage of the first operational amplifier, the positive voltage and the negative voltage being in common-ground and equal in absolute value;
   a positive adjustment module including:
      an input end coupled to the positive voltage, and
      an output end as a positive output voltage of the two-path symmetrical-output adjustable power supply,
      wherein the positive adjustment module is configured to adjust the positive output voltage according to a second feedback control based on a given voltage and the positive output voltage; and
   a negative adjustment module including:
      an input end coupled to the negative voltage, and
      an output end as a negative output voltage of the two-path symmetrical-output adjustable power supply,
   wherein the negative adjustment module is configured to adjust the negative output voltage according to the positive output voltage,
   wherein the first operational amplifier includes:
      a positive-phase input end coupled to the input end of the positive adjustment module for receiving the positive voltage,
      a negative-phase input end coupled to the output end of the positive adjustment module for receiving the positive output voltage, and
      the output end for outputting a voltage difference between the positive output voltage and the positive voltage as the output voltage of the first operational amplifier, and
   wherein the two-path symmetrical-output adjustable power supply is configured to:
      provide, as an input of the first operational amplifier, the positive voltage multiplied by 1/K and the positive output voltage multiplied by 1/K, K being an integer greater than 1, and
      recover the output voltage of the first operation amplifier by K times to be the voltage difference between the positive output voltage and the positive voltage.

2. The two-way symmetrical-output adjustable power supply according to claim 1, wherein the positive adjustment module comprises:
   a first adjusting transistor including:
      a first end coupled to the positive voltage,
      a second end coupled to the positive output voltage, and
      a control end coupled to an output end of a second operational amplifier; and
   the second operational amplifier including:
      a negative-phase input end coupled to the positive output voltage through a first resistor and to the ground through a second resistor, and
      a positive-phase input end coupled to the given voltage.

3. The two-way symmetrical-output adjustable power supply according to claim 2, wherein the first adjusting transistor is a triode or an MOS transistor.

4. The two-way symmetrical-output adjustable power supply according to claim 1, wherein the negative adjustment module comprises:
   a second adjusting transistor including:
      a first end coupled to the negative output voltage,
      a second end coupled to the negative voltage, and
      a control end coupled to the output end of a third operational amplifier; and
   the third operational amplifier including:
      a positive-phase input end coupled to the ground, and
      a negative-phase input end coupled to the positive output voltage through a third resistor and the negative output voltage through a fourth resistor.

5. The two-way symmetrical-output adjustable power supply according to claim 4, wherein the third resistor and the fourth resistor are equal in resistance value.

6. The two-way symmetrical-output adjustable power supply according to claim 4, wherein the second adjusting transistor is a triode or a MOS transistor.

7. The two-way symmetrical-output adjustable power supply according to claim 1, further comprising:
   a positive load adjustment module including:
      a first end coupled to the positive output voltage,
      a second end coupled to the ground through a seventh resistor, and
      a third end coupled to an output end of a fourth operational amplifier;

a negative load adjustment module including:
  a first end coupled to the second end of the positive load adjustment module,
  a second end coupled to the negative output voltage, and
  a third end coupled to the output end of the fourth operational amplifier; and
the fourth operational amplifier including:
  a positive-phase input end to be in common-ground with the switching power supply module, and
  a negative-phase input end coupled to the positive voltage through a fifth resistor and the negative voltage through a sixth resistor.

8. The two-way symmetrical-output adjustable power supply according to claim 7, wherein the fifth resistor and the sixth resistor are equal in resistance value.

9. The two-way symmetrical-output adjustable power supply according to claim 7, wherein:
the positive load adjustment module comprises a third adjusting transistor, and the third end of the positive load adjustment module is a control end of the third adjusting transistor, and
the negative load adjustment module comprises a fourth adjusting transistor, and the third end of the negative load adjustment module is a control end of the fourth adjusting transistor.

10. The two-way symmetrical-output adjustable power supply according to claim 9, wherein:
the third adjusting transistor is a MOS transistor, and
the fourth adjusting transistor is a MOS transistor.

11. The two-way symmetrical-output adjustable power supply according to claim 9, wherein:
the third adjusting transistor is a triode, and
the fourth adjusting transistor is a triode.

12. The two-way symmetrical-output adjustable power supply according to claim 1, wherein the given voltage is among a range defined by the reference voltage.

13. A two-path symmetrical-output adjustable power supply, comprising:
a switching power supply module including:
  a first input end coupled to a DC power supply, and
  a second input end coupled to an output end of a first operational amplifier,
  wherein the switching power supply module is configured to output a positive voltage and a negative voltage according to a first feedback control based on a reference voltage and an output voltage of the first operational amplifier, the positive voltage and the negative voltage being in common-ground and equal in absolute value;
a positive adjustment module including:
  an input end coupled to the positive voltage, and
  an output end as a positive output voltage of the two-path symmetrical-output adjustable power supply,
  wherein the positive adjustment module is configured to adjust the positive output voltage according to a second feedback control based on a given voltage and the positive output voltage; and
a negative adjustment module including:
  an input end coupled to the negative voltage, and
  an output end as a negative output voltage of the two-path symmetrical-output adjustable power supply,
  wherein the negative adjustment module is configured to adjust the negative output voltage according to the positive output voltage, wherein the first operational amplifier includes:
  a positive-phase input end coupled to the positive voltage,
  a negative-phase input end coupled to the positive output voltage, and
  the output end for outputting the output voltage of the first operational amplifier that is substantially identical to a voltage difference between the positive voltage and the positive output voltage;
a first proportional adjustment module including:
  an input end coupled to the positive voltage, and
  an output end coupled to the positive-phase input end of the first operational amplifier through an eighth resistor,
  wherein the first proportional adjustment module is configured to output the positive voltage multiplied by 1/K, the K is an integer greater than 1; and
a second proportional adjustment module including:
  an input end coupled to the positive output voltage, and
  an output end coupled to the negative-phase input end of the first operational amplifier through a ninth resistor,
  wherein the second proportional adjustment module is configured to output the positive output voltage multiplied by 1/K,
wherein the positive-phase input end of the first operational amplifier is coupled to the ground through a tenth resistor,
wherein the negative-phase input end of the first operational amplifier is coupled to the output end of the first operational amplifier through an eleventh resistor,
wherein the output end of the first operational amplifier is coupled to the second input end of the switching power supply module through a twelfth resistor,
wherein the second input end of the switching power supply module is coupled to the ground through a thirteenth resistor, and
wherein the first operational amplifier, the eighth resistor, the ninth resistor, the tenth resistor and the eleventh resistor are configured to recover voltage attenuation proportion K introduced by the first proportional adjustment module and the second proportional adjustment module, such that the output voltage of the first operational amplifier is substantially identical to the voltage difference between the positive output voltage and the positive voltage.

14. The two-way symmetrical-output adjustable power supply according to claim 13, wherein:
the eighth resistor and the ninth resistor are equal in resistance value,
the tenth resistor and the eleventh resistor are equal in resistance value, and
the resistance value of the tenth resistor is as K times as that of the eighth resistor.

15. The two-way symmetrical-output adjustable power supply according to claim 13, wherein the switching power supply module comprises a fifth operational amplifier including:
a positive-phase input end coupled to the reference voltage;
a negative-phase input end coupled to the second input end of the switching power supply module; and
an output end coupled to the negative-phase input end of the fifth operational amplifier through a first capacitance and a fourteenth resistor.

16. A method comprising:
receiving an input voltage from a DC power supply;

generating a positive voltage and a negative voltage based on the input voltage and according to a first feedback control based on a reference voltage and an output voltage of an operation amplifier, the positive voltage and the negative voltage being in common-ground and equal in absolute value;

outputting a positive output voltage based on the positive voltage and according to a second feedback control based on a given voltage and the positive output voltage; and outputting a negative output voltage based on the negative voltage and the positive output voltage, wherein the output voltage of the operational amplifier is substantially identical to a voltage difference between the positive output voltage and the positive voltage;

providing, as an input of the operational amplifier, the positive voltage multiplied by 1/K and the positive output voltage multiplied by 1/K, K being an integer greater than 1; and recovering the output voltage of the operation amplifier by K times to be the voltage difference between the positive output voltage and the positive voltage.

17. The method according to claim 16, wherein outputting a positive output voltage comprises adjusting the positive output voltage according to a voltage division feedback of the positive output voltage and the given voltage, and wherein outputting a negative output voltage comprises controlling the negative output voltage to equivalently track the positive output voltage.

18. The method according to claim 16, further comprising:

preventing an asymmetry output between the positive voltage and the negative voltage.

19. The method according to claim 16, further comprising:

providing a portion of the voltage difference for the first feedback control; and obtaining the positive output voltage by subtracting the voltage difference from the positive voltage.

* * * * *